UNITED STATES PATENT OFFICE.

JOSEF HORAK, OF KÖNIGSWINTER, GERMANY.

FIREPROOF LIME SANDSTONE.

SPECIFICATION forming part of Letters Patent No. 712,799, dated November 4, 1902.

Application filed February 11, 1902. Serial No. 93,627. (No specimens.)

*To all whom it may concern:*

Be it known that I, JOSEF HORAK, a subject of the Emperor of Germany, residing at Königswinter, in the German Empire, have invented new and useful Improvements in Fireproof Lime Sandstones, of which the following is a specification.

The manufacture of Dinas blocks was heretofore dependent upon a splintery granular material made by breaking up quartzite or quartz material. It was not possible to employ sand for the manufacture of these blocks, because the sand required too large a quantity of binding material if the block was to possess the necessary mechanical soundness. Furthermore, experience has shown that only particular kinds of quartzy raw materials are utilizable for the manufacture of Dinas stones, such kinds being those which on burning expand only to a slight extent.

Now this invention relates to a process for the manufacture of fireproof quartz containing blocks of sand with an addition of lime and is based upon the fact that all kinds of quartz sand are available for the manufacture of Dinas blocks if the said sand before burning is mixed with lime and molded and subjected to a hardening process by steam or under gas-pressure in sealed vessels, as is customary in the manufacture of lime sandstone. The main advantage over and the greatest difference from the old process for the manufacture of Dinas blocks is that the blocks need not, as formerly, be slowly dried, charged into the kiln in the form of very delicate blocks, and burned, but they are converted by a rapid hardening process to a stone-hard mass, which consists for the greatest part of silicate of lime, before they are charged into the kiln and subjected to the burning process. The temperature at which the blocks should be burned is at least 1,300° centigrade. The chemical or chemical technical alteration which takes place with the quartz in the hardening process is not yet determined; but it is a fact that a lime sandstone having a small proportion of lime offers no difficulty in burning at the higher temperatures, and the resulting product is a good-sounding fireproof block, which on repeated burning shows no appreciable expansion. The lime contents of this stone need only be small, as the cementing of the individual sand grains is effected ultimately by the burning process. The process suffers no alteration if, for example, the lime is replaced by another flux material—for instance, hydraulic lime, clay, iron oxid, alkaline earths, or alkalies.

The method of manufacture is as follows: Quartz sand or broken pebble is intimately mixed with a small quantity of caustic lime, either slaked or unslaked, and, as is customary in the manufacture of lime-sand blocks, pressed and hardened. The hardened blocks are conveyed to a kiln and burned at a proper temperature. The burned blocks are good-sounding, possess considerable capacity for withstanding changes of temperature, and are of high melting-point.

Having now particularly described and ascertained the nature of my said invention and in what manner the same is to be performed, I declare that what I claim is—

1. The process of making Dinas blocks which consists in molding a mixture of finely-divided quartz containing mineral fragments with lime, molding the mixture into blocks, hardening the blocks by subjecting them to high temperature under fluid-pressure and then burning the hardened blocks, substantially as described.

2. The process of making Dinas blocks which consists in molding a mixture of sand and lime into a so-called lime-sand block, hardening said block by subjecting it to high temperature under fluid-pressure, and then burning said block, substantially as described.

JOSEF HORAK.

Witnesses:
JULIUS MEINHARDT,
HANS WIENHAUER.